(12) United States Patent  
Houle et al.

(10) Patent No.: US 7,423,507 B2  
(45) Date of Patent: Sep. 9, 2008

(54) INDUCTANCE ASSEMBLY FOR AN ELECTRIC MACHINE

(75) Inventors: Martin Houle, Laval (CA); Jean-Marc Cyr, Candiac (CA); Jianhong Xu, Longueuil (CA); Ruisheng Shi, Montreal (CA); Jane Roundell, Saint-Lambert (CA); George Bursuc, Brossard (CA); François Messier, Varennes (CA); Gabriel Rakotonirina, Trois-Riviéres (CA)

(73) Assignee: TM4 Inc., Quebec (CA)

( * ) Notice: Subject to any disclaimer, the term of this patent is extended or adjusted under 35 U.S.C. 154(b) by 0 days.

(21) Appl. No.: 11/853,875

(22) Filed: Sep. 12, 2007

(65) Prior Publication Data

US 2008/0117013 A1   May 22, 2008

Related U.S. Application Data

(60) Provisional application No. 60/844,087, filed on Sep. 13, 2006.

(51) Int. Cl.  
*H01F 27/08* (2006.01)

(52) U.S. Cl. .......................................... 336/55; 310/52

(58) Field of Classification Search ............. 336/55–62, 336/83, 180–186, 210; 310/52–65  
See application file for complete search history.

(56) References Cited

U.S. PATENT DOCUMENTS

| 4,523,169 | A  | * | 6/1985  | Hay ............................. 336/60 |
| 5,910,691 | A  | * | 6/1999  | Wavre ......................... 310/12 |
| 6,601,547 | B2 | * | 8/2003  | Al-Hawaj .................. 123/56.1 |
| 6,633,097 | B2 | * | 10/2003 | Dunlap et al. ................. 310/54 |
| 2005/0116553 | A1 | | 6/2005 | Poulin et al. |

FOREIGN PATENT DOCUMENTS

WO   2005/055396   6/2005

* cited by examiner

*Primary Examiner*—Tuyen T. Nguyen  
(74) *Attorney, Agent, or Firm*—Fay Kaplun & Marcin, LLP

(57) ABSTRACT

The present invention is generally concerned with an inductance assembly that is so configured and sized as to be inserted inside the cooling assembly of an electric machine to thereby decrease the overall volume of the machine.

25 Claims, 13 Drawing Sheets

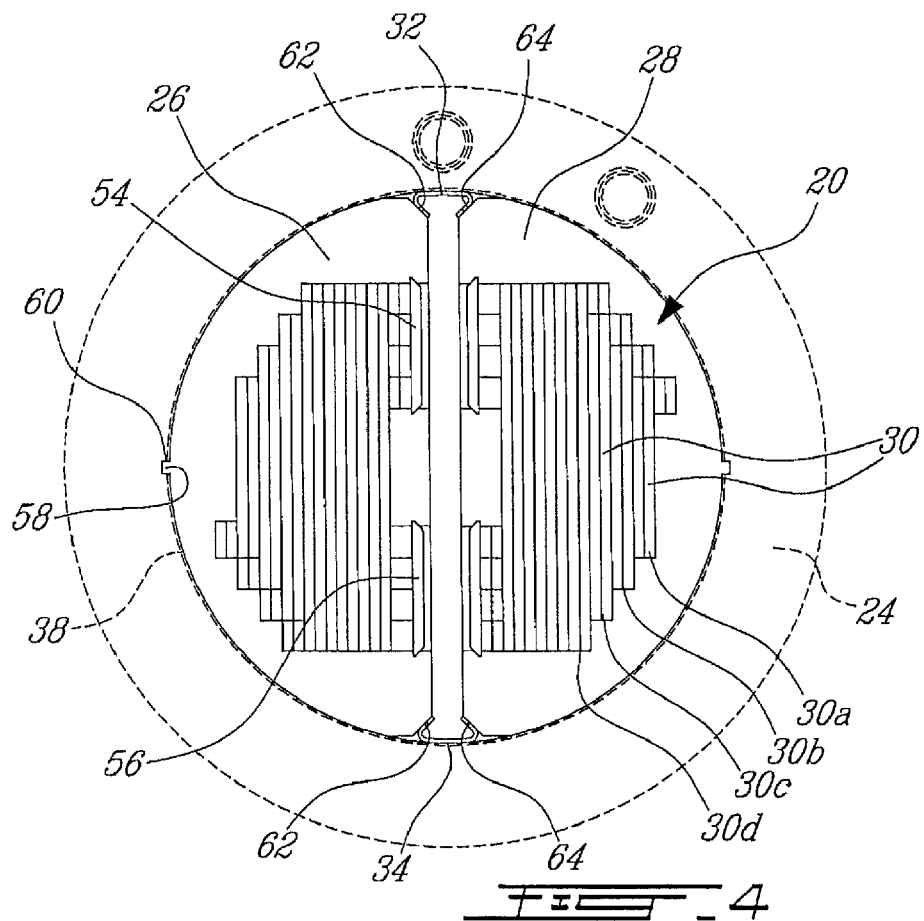
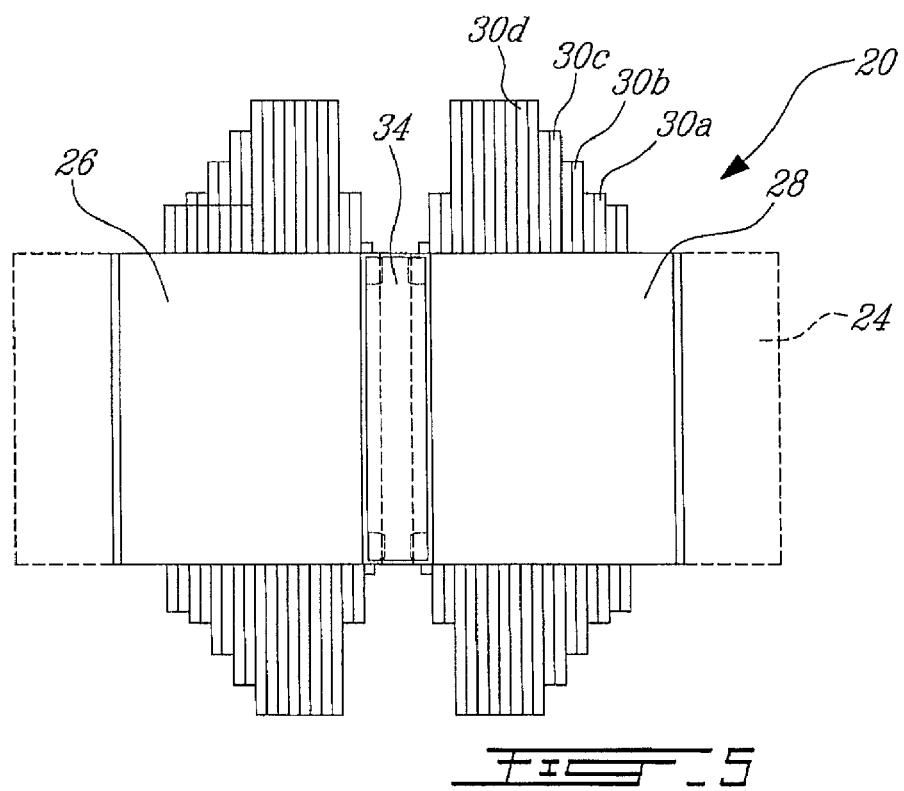

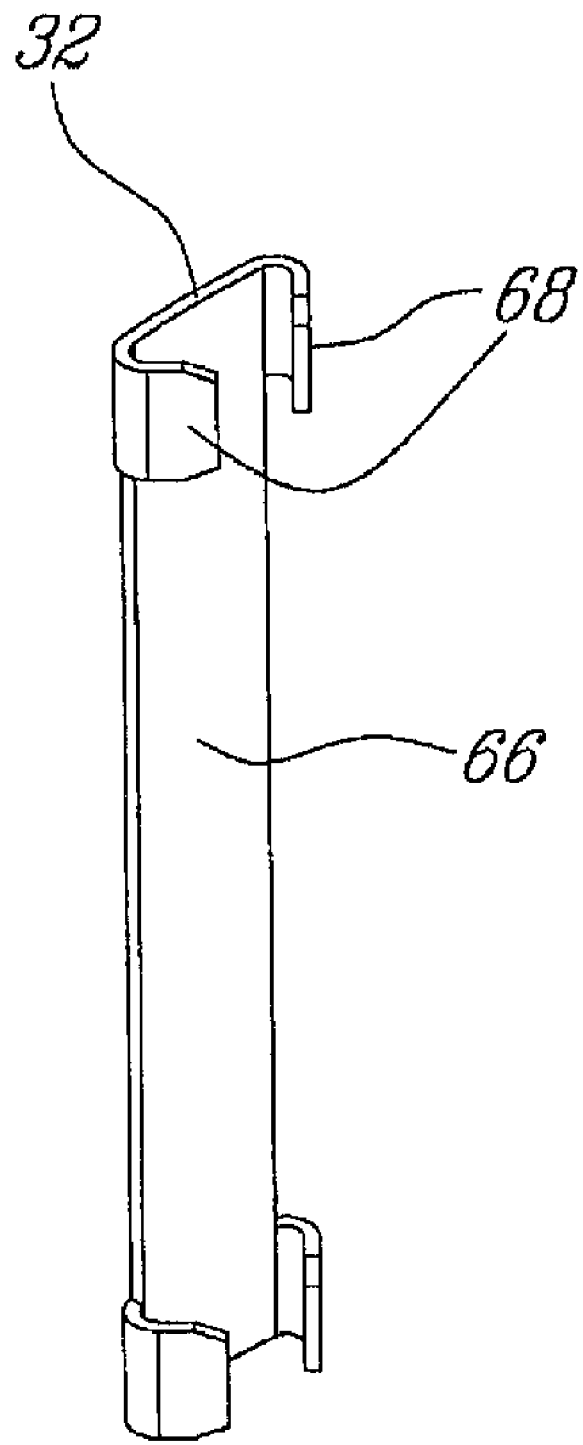

INDUCTANCE ASSEMBLY FOR AN ELECTRIC MACHINE

PRIORITY CLAIM

This application claims the benefit of U.S. Provisional Patent Application filed on Sep. 13, 2006 Ser. No. 60/844,087, the specification of which is expressly incorporated herein, in its entirety, by reference.

FIELD

The present invention relates to electric machines. More specifically, the present invention is concerned with electric machines provided with an inductance assembly mounted therein.

BACKGROUND

Electric machines are well known in the art. They usually have a fixed stator and a rotating rotor. Generally the stator is external and the rotor is rotatably mounted inside the stator, coaxially therewith.

In some electric machines, the stator is internal and the cylindrical rotor is coaxially mounted outside the stator. These machines will be referred herein as internal stator electric machines.

Some of these electric machines are powered by battery and use a boost circuit to selectively increase the voltage of the battery. This is interesting in many applications, for example to ensure that the voltage presented to the load is constant even when the voltage from the battery decreases.

Such a boost circuit is schematically illustrated in FIG. 1. In this circuit, an inductance, a capacitor, two transistor and two diodes are used to increase the voltage of the battery as presented to the load. This circuit will not be described in greater details herein since it is believed to be understood by one skilled in the art of electric machines control.

It is to be noted that in many applications the size of the inductance is important since it must carry strong currents. Also, the inductance generates heat that must be dissipated for adequate operation of the electric machine.

OBJECTS OF THE INVENTION

An object of the present invention is therefore to provide an inductance assembly for an electric machine

BRIEF DESCRIPTION OF THE DRAWINGS

In the appended drawings:

FIG. 4 is a top plan view of the inductance assembly of FIG. 2, the cooling assembly of the electric machine being shown in dashed lines;

FIG. 5 is a side elevational view of the inductance assembly of FIG. 2, the cooling assembly of the electric machine being shown in dashed lines;

FIG. 6 is a perspective view of a retaining element used in the inductance assembly of FIG. 2;

FIG. 14 11 is a top plan view of an alternate cooling assembly in which the inductance assembly of FIG. 7 is mounted.

DETAILED DESCRIPTION

Figure 1:
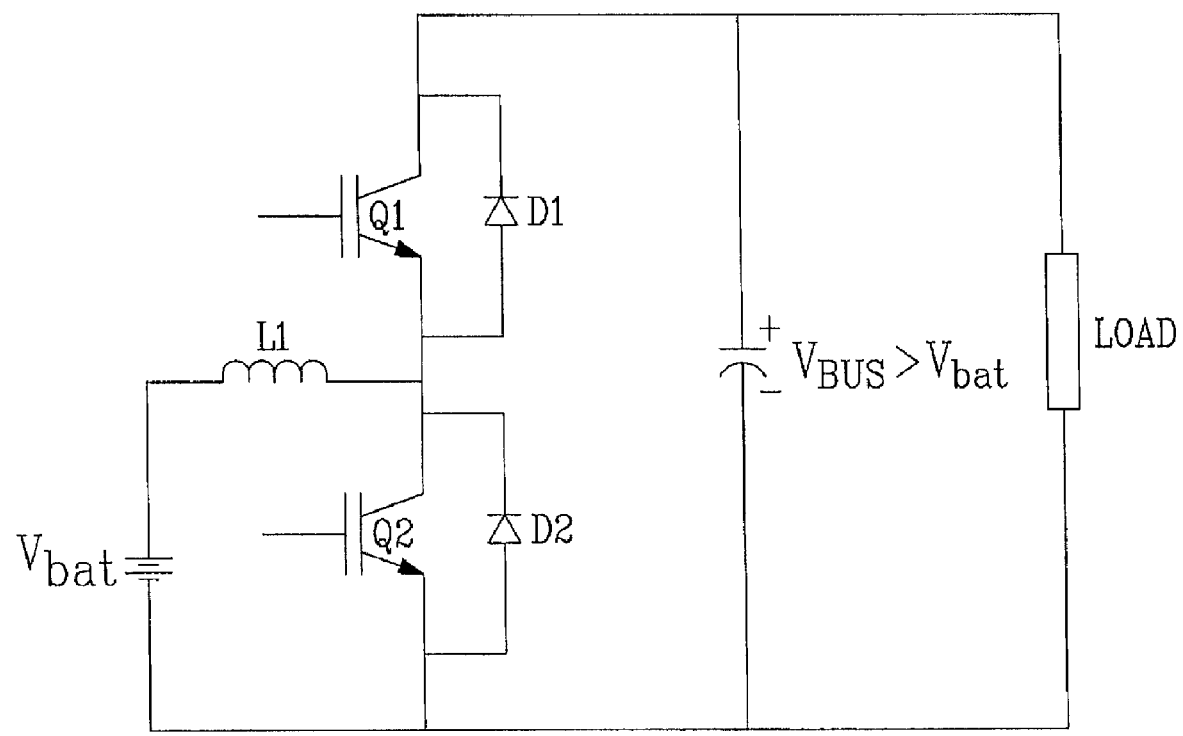
FIG. 1 is a schematic circuit of a boost circuit.

In accordance with an illustrative embodiment of the present invention, there is provided an inductance assembly to be mounted in a cooling assembly having a generally cylindrical inner surface; the inductance assembly comprising:

at least two longitudinal body portions each having a generally semi-cylindrical outer surface so configured as to be mounted to the generally cylindrical inner surface of the cooling assembly; each body portion being provided with a longitudinal central arm defining first and second longitudinal channels;

at least one coil provided with first and second longitudinal leg portions provided between first and second head portions; the first leg portion being so configured as to be inserted in the first longitudinal channel and the second leg portion being so configured as to be inserted in the second longitudinal channel; and at least one clip so mounted between the at least two longitudinal body portions as to bias the generally semi-cylindrical outer surfaces of the at least two longitudinal body portions to the generally cylindrical inner surface of the cooling assembly.

According to another aspect of the present invention, there is provided an inductance assembly to be mounted in an electric machine provided with an internal stator having a generally cylindrical inner surface; the inductance assembly comprising:

a cooling assembly having a generally cylindrical outer surface configured and sized to be inserted in the internal stator, and a generally cylindrical inner surface;

at least two longitudinal body portions each having a generally semi-cylindrical outer surface so configured as to be mounted to the generally cylindrical inner surface of the cooling assembly; each body portion being provided with a longitudinal central arm defining first and second longitudinal channels;

at least one coil provided with first and second longitudinal leg portions provided between first and second head portions; the first leg portion being so configured as to be inserted in the first longitudinal channel and the second leg portion being so configured as to be inserted in the second longitudinal channel; and at least one clip so mounted between the at least two longitudinal body portions as to bias the generally semi-cylindrical outer surfaces of the at least two longitudinal body portions to the generally cylindrical inner surface of the cooling assembly.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

Other objects, advantages and features of the present invention will become more apparent upon reading of the following non-restrictive description of illustrative embodiments thereof, given by way of example only with reference to the accompanying drawings.

Generally stated, an inductance assembly according to an illustrative embodiment of the present invention is so configured and sized as to be inserted inside the internal stator of an electric machine and securely mounted therein.

Turning now to FIG. 2 to 6 of the appended drawings, an inductance assembly 20 according to a first illustrative embodiment of the present invention will be described.

Figure 2:
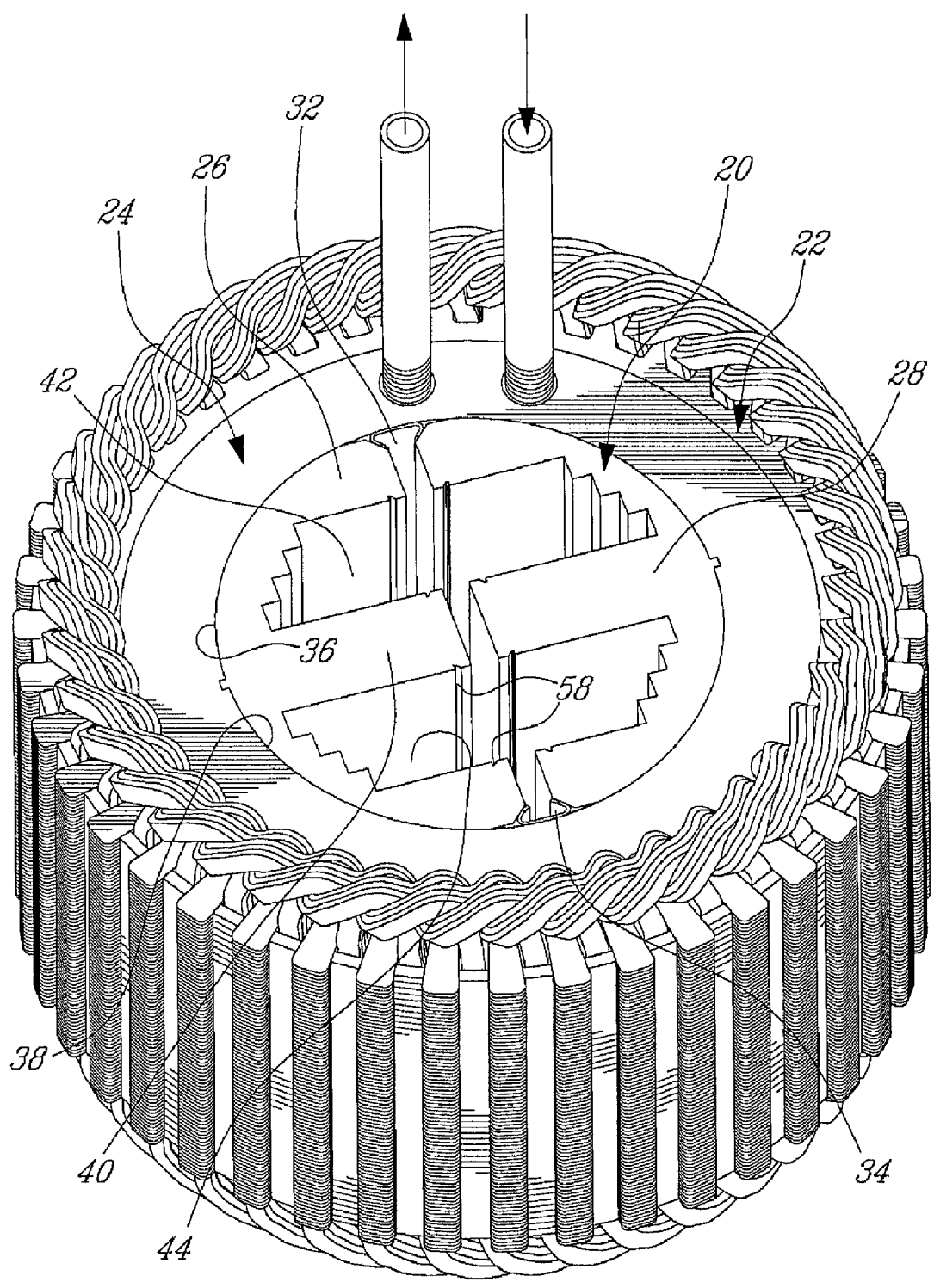
FIG. 2 is a perspective view of an inductance assembly according to a first illustrative embodiment of the present invention mounted inside the internal stator of an electric machine, the coils of the inductance assembly being omitted for illustration purpose.

FIG. 2 illustrates a portion of the inductance assembly 20 mounted inside an internal stator 22 of an electric machine (not shown). More specifically, the inductance assembly 20 is mounted inside a generally tubular cooling assembly 24, itself mounted inside the generally tubular internal stator 22.

The inductance assembly 20 includes two body portions 26 and 28, a plurality of coils 30 inserted in the body portions 26 and 28 (see FIGS. 3, 4 and 5) and two clips 32, 34 maintaining the inductance assembly 20 in the cooling assembly 24.

It is to be noted that the coils 30 are not illustrated in FIG. 2 to better show the features of the body portions 26 and 28. It is also to be noted that since the body portions 26 and 28 are identical, only the body portion 26 will be described hereinbelow, for concision purpose.

As can be better seen from FIG. 2, the body portion 26 is generally E-shaped, having a semi-cylindrical outer surface 36 so configured and sized as to adequately contact the internal cylindrical surface 38 of the cooling assembly 24. The body portion 26 includes a central arm 40 defining two stepped longitudinal channels 42 and 44 so configured as to receive the coils 30.

Figure 3:
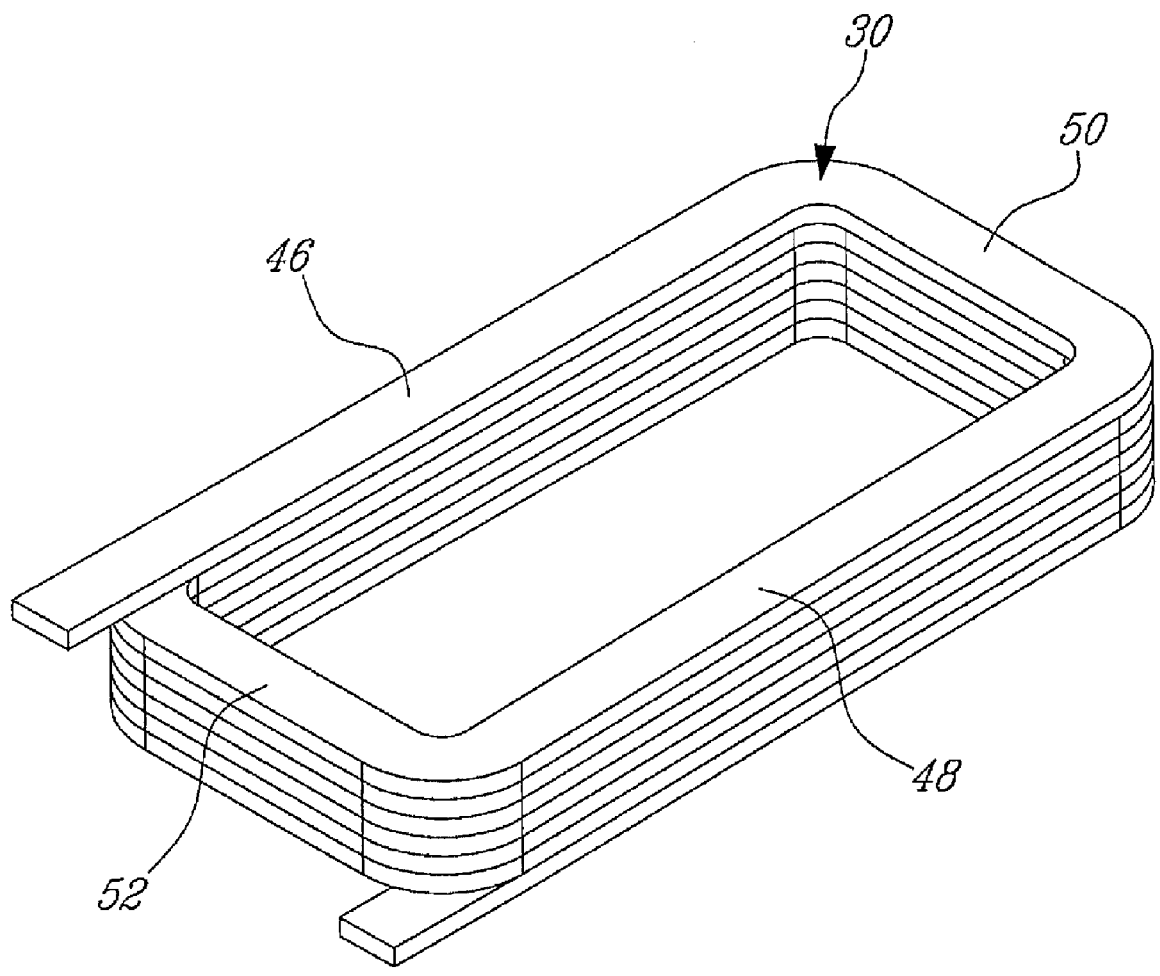
FIG. 3 is a perspective view of a coil to be inserted in the inductance assembly of FIG. 2.

Turning now to FIG. 3 of the appended drawings, an illustrative coil 30 will be described. The coil 30 includes many turns of rectangular wire each provided with first and second leg portions 46 and 48 integrally mounted between heads 50 and 52 to yield a continuous coil.

It is to be noted that in the illustrative embodiment of the inductance assembly, there are four different coils 30 used to form the inductance inserted in each of the body portions 26 and 28 (only one shown in FIG. 3). These four coils 30 are so configured and sized as to be inserted inside each other. It will be understood that the number of coils 30 used may vary.

FIGS. 4 and 5 illustrate the four coils 30a, 30b, 30c and 30d, coil 30a being the smallest and coil 30d being the largest.

As better seen in FIG. 4, once the coils 30a-30d have been inserted in the longitudinal channels 42 and 44, two stoppers 54 and 56 are slidably engaged in the triangular notches 58 (see FIG. 2) facing each others in the channels to maintain the coils in place.

Also seen on this figure are key 58 and keyway 60 arrangements provided between the external surface 36 of the body portion 26 and the internal surface 38 of the cooling assembly. The key and keyway arrangement is provided to both prevent rotation of the inductance assembly 20 in the cooling assembly 24 and to properly position the body portions 26 and 28 during assembly.

FIG. 4 also shows that the external surface 36 of the body portions 26 and 28 includes chamfered edges 62 and 64 to allow the insertion of the two clips 32 and 34 between the body portions 26 and 28.

The clip 32 is illustrated in FIG. 6. It is to be noted that clip 34 is identical to clip 32. Clip 32 is made of resilient material and has a longitudinal flat body 66 provided, at both ends, with curved spring portions 68. Therefore, once inserted in the cooling assembly 24 between the two body portions 26 and 28, the two clips 32 and 34 will bias the external surfaces 36 of the body portions towards the internal surface 38 of the cooling assembly 24.

It is believed to be within the reach of one skilled in the art to determine the number of coils 30 used to form the inductance and the method of interconnection between the coils depending on the application of the inductance assembly.

It will also be apparent to those skilled in the art that since there is adequate contact between the external surface of the body portions 26 and 28 and the internal surface of the cooling assembly 24, the heat generated by the coils 30 will be collected by the cooling assembly 24 and removed from the electric machine.

Turning now to FIGS. 7 to 10 of the appended drawings, an inductance assembly 100 according to a second illustrative embodiment of the present invention will be described. It is to be noted that since the inductance assembly 100 is very similar to the inductance assembly 20 described hereinabove with reference to FIGS. 2 to 6, only the differences therebetween will be described hereinbelow.

Generally stated the main difference between the two inductance assemblies relates to the manner used to mount them inside the cooling assembly 24.

Indeed, while clips 32, 34 provided with respective spring portions are used for the inductance assembly 20 (see FIG. 6), two complementary wedge-shaped blocks 102 and 104 (see FIG. 10) are used to bias the body portions 106 and 108 apart from one another. The blocks 102 and 104 are advantageously made of non-magnetic material such as heat resistant plastic or aluminum alloy.

Figure 7:
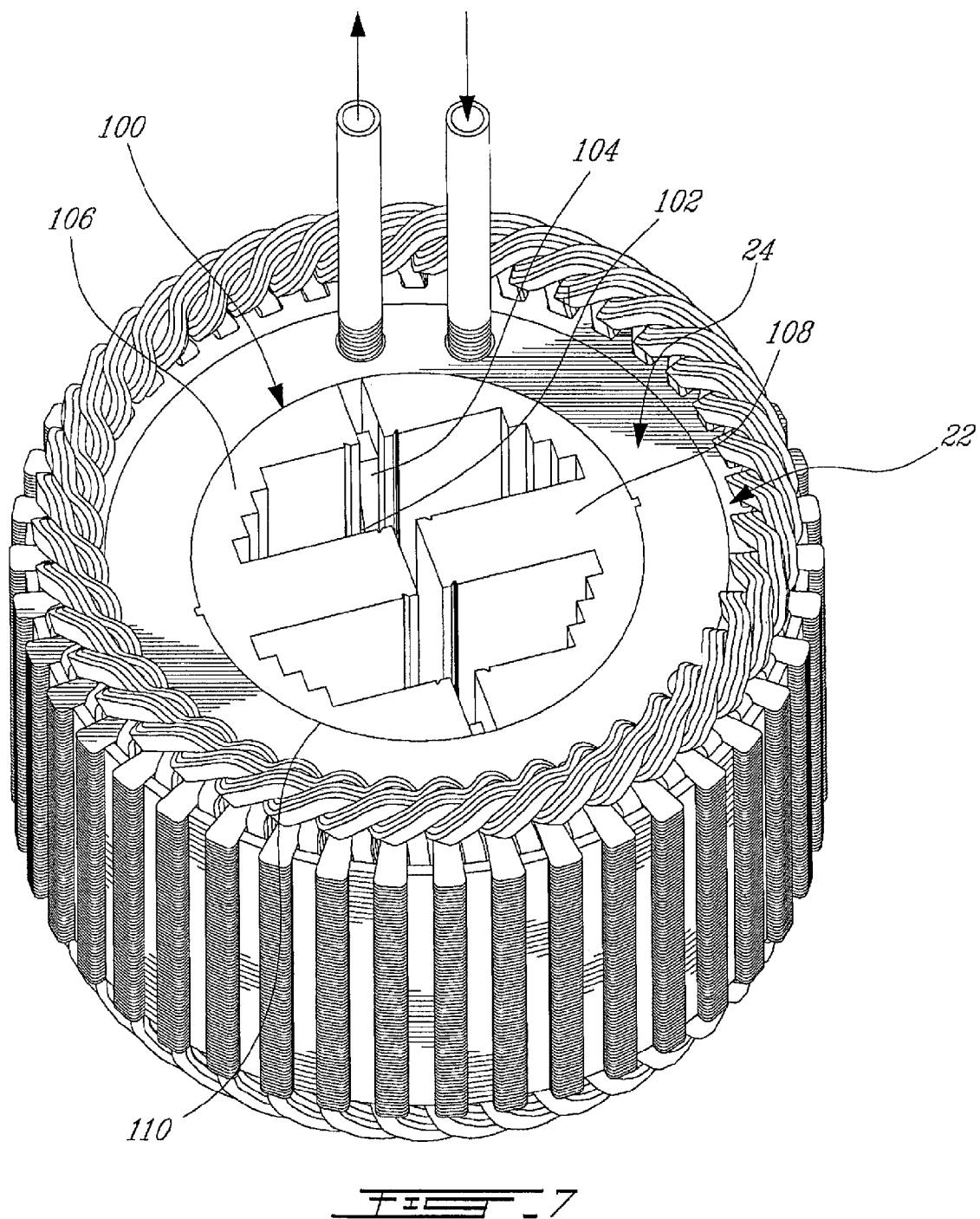
FIG. 7 is a perspective view of an inductance assembly according to a second illustrative embodiment of the present invention mounted inside the internal stator of an electric machine, the coils of the inductance assembly being omitted for illustration purpose.
Figure 8:
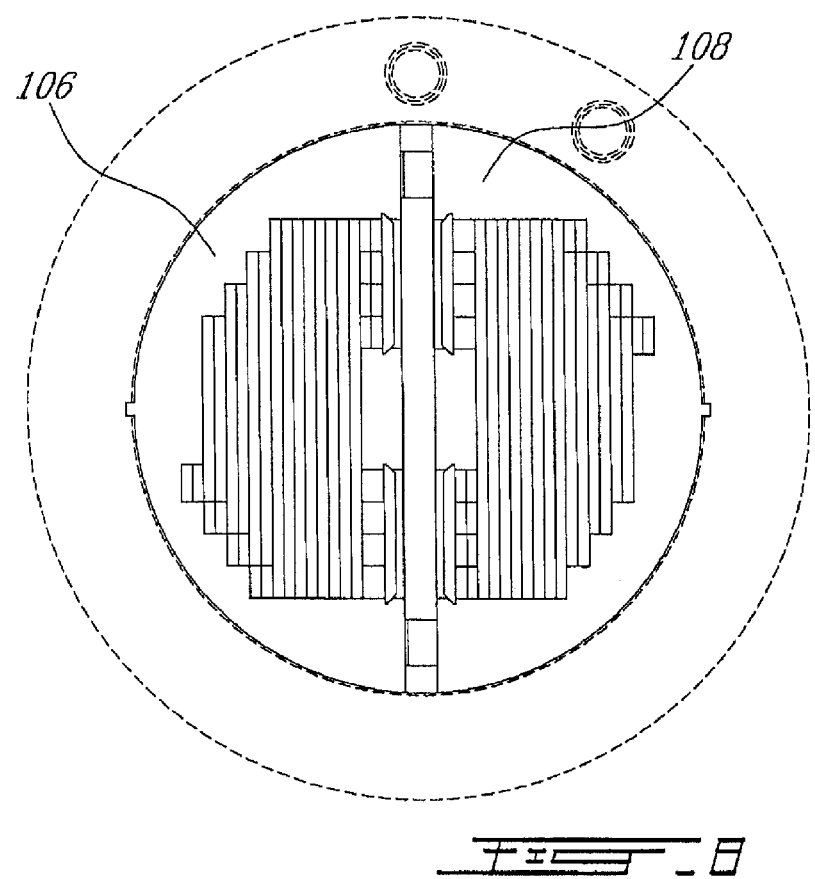
FIG. 8 is a top plan view of the inductance assembly of FIG. 7, the cooling assembly of the electric machine being shown in dashed lines.
Figure 9:
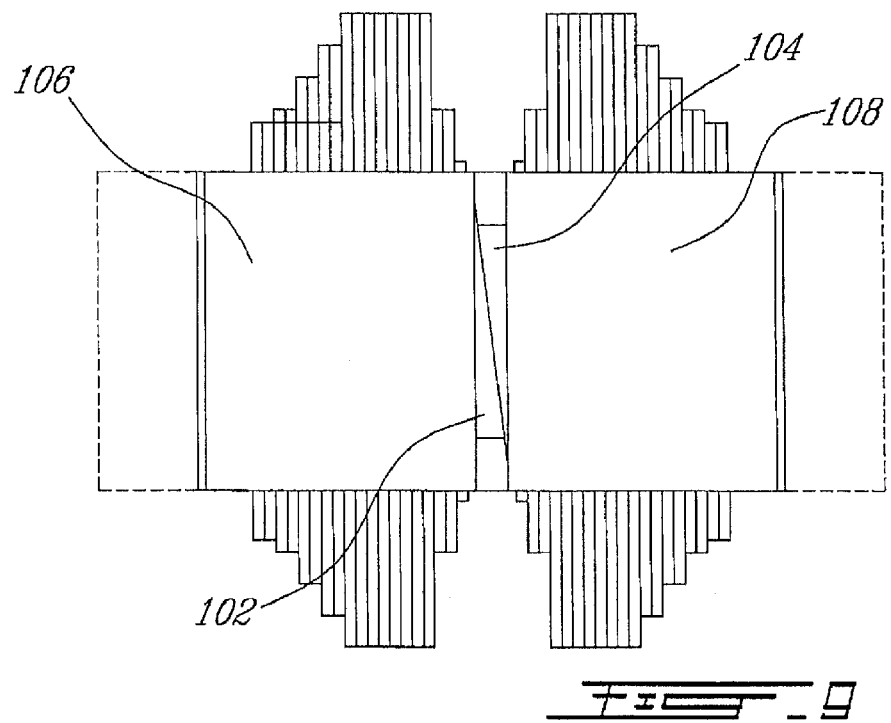
FIG. 9 is a side elevational view of the inductance assembly of FIG. 7, the cooling assembly of the electric machine being shown in dashed lines.
Figure 10:
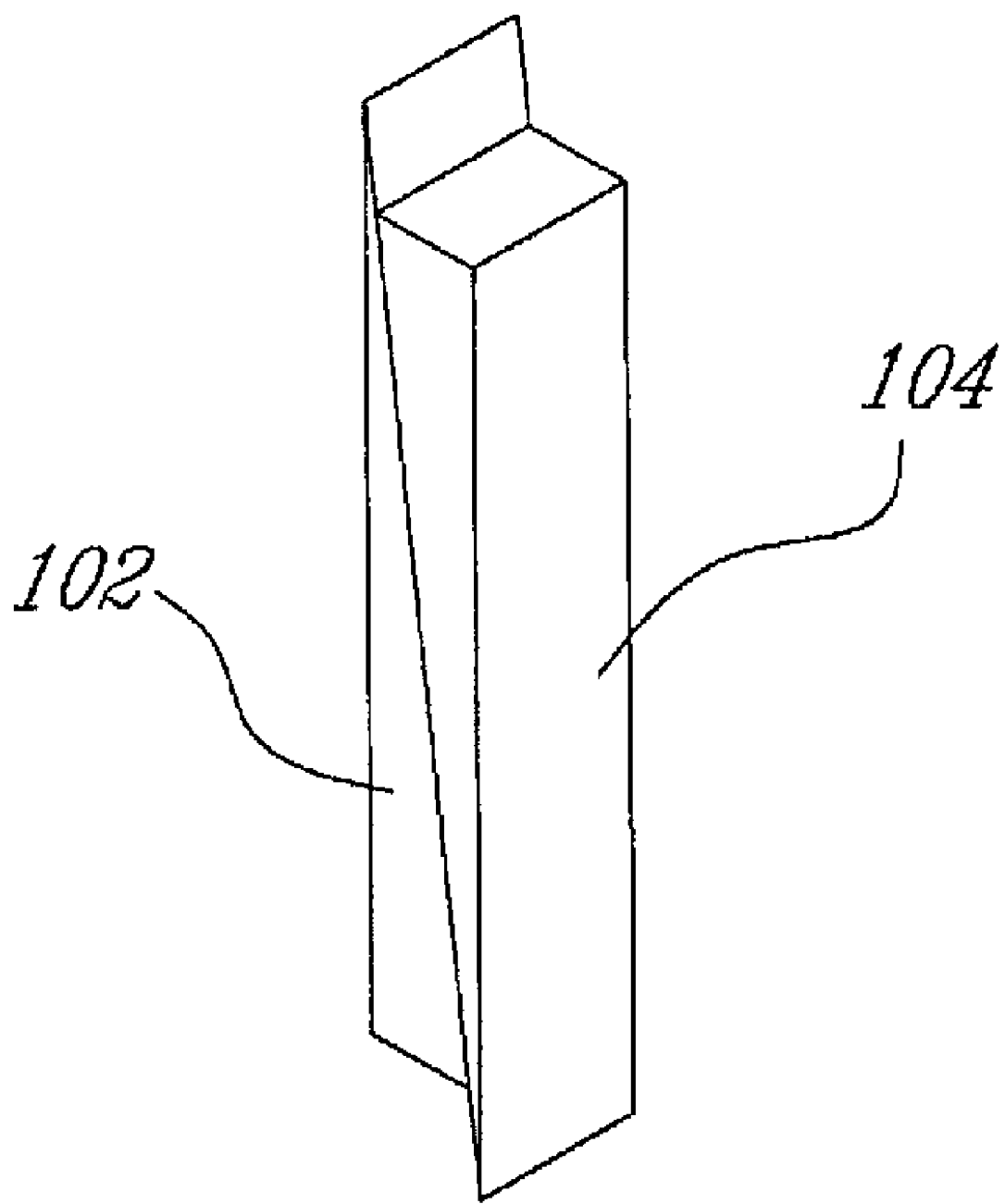
FIG. 10 is a perspective view of a retaining element used in the inductance assembly of FIG. 7.

It is to be noted that while two sets of the complementary wedge-shaped blocks are used in the inductance assembly of FIG. 7, a third set of blocks (see FIGS. 11 and 12) could be used between the central arms 40 of the body portions.

Also the external surface 110 of the body portions 106 and 108 may be completely semi-cylindrical since the chamfered edges 62 and 64 (see FIG. 4) that allow the two clips 32 and 34 to be inserted between the body portions are not required.

Turning now to FIGS. 11 to 16 of the appended drawings, two alternate cooling assemblies in which the inductance assembly 100 illustrated in FIG. 7 is inserted will be described.

Figure 11:
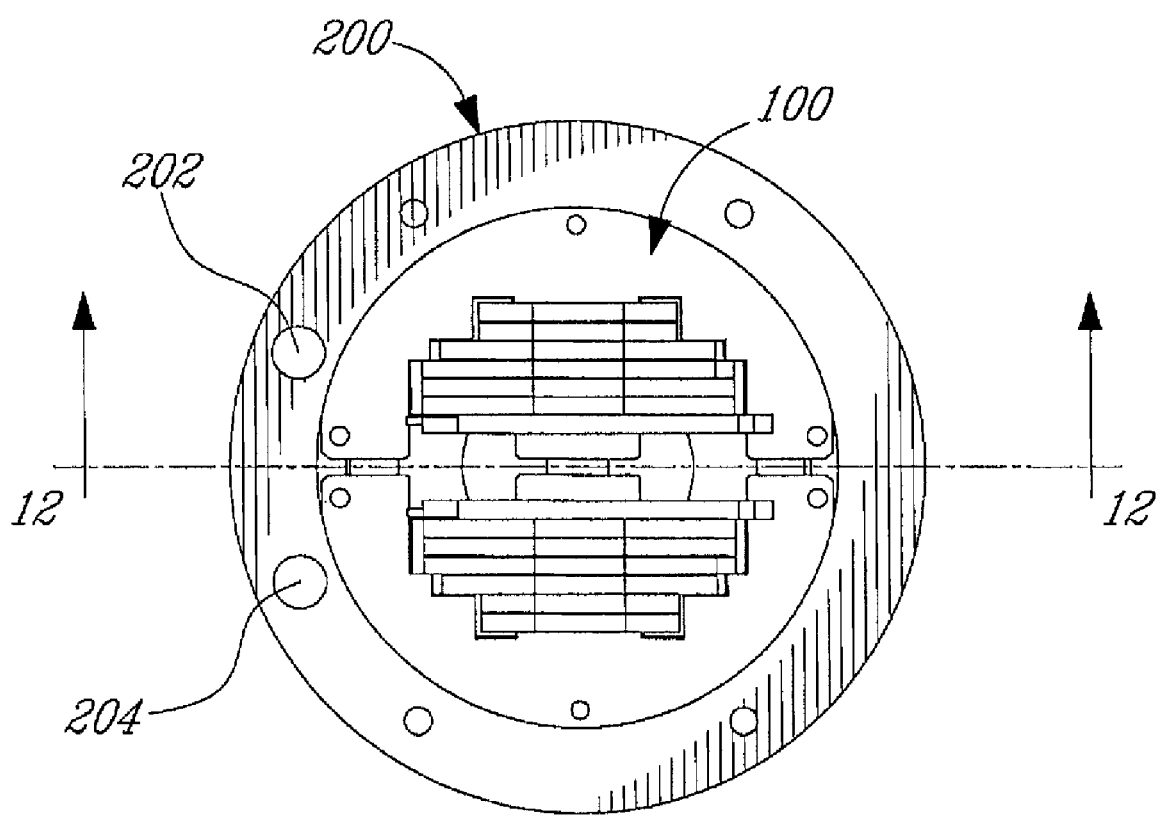
FIG. 11 is a top plan view of a cooling assembly in which the inductance assembly of FIG. 7 is mounted.
Figure 12:
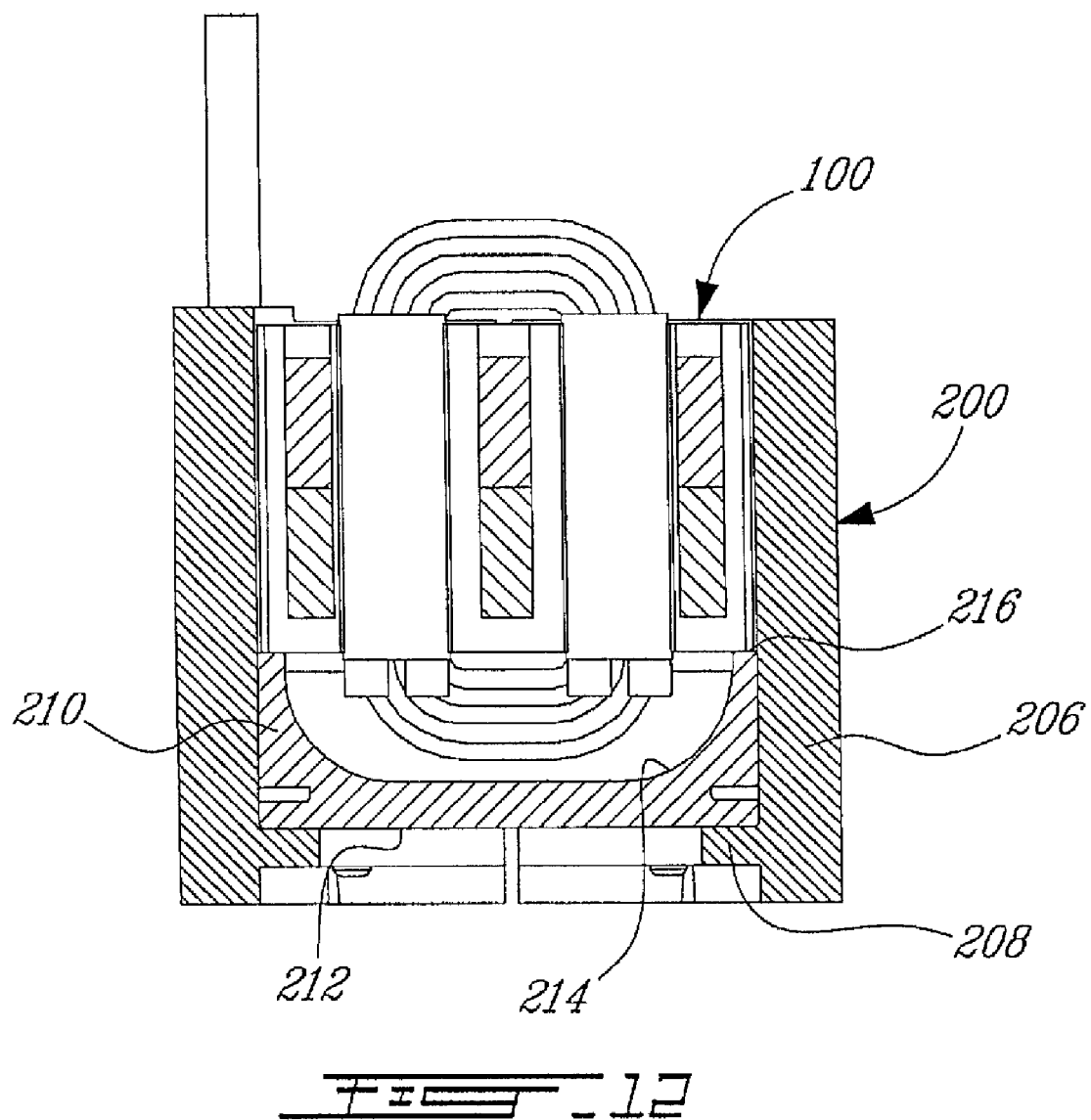
FIG. 12 is a sectional view taken along line 12-12 of FIG. 11.
Figure 13:
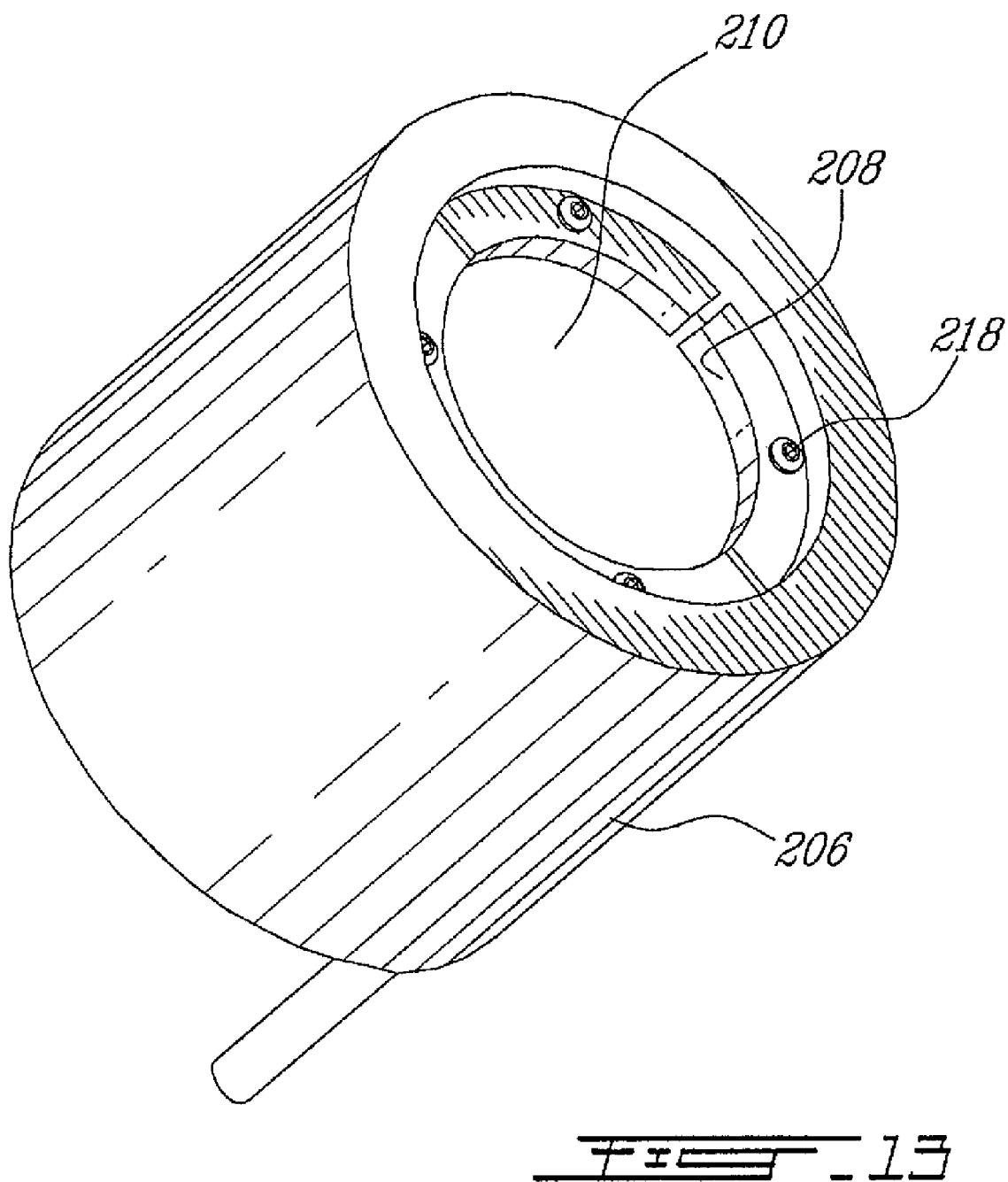
FIG. 13 is a bottom perspective view of the cooling assembly of FIG. 11.

Referring more specifically to FIGS. 11 to 13, a cooling assembly 200 will be described. The cooling assembly 200 is made of a heat conducting material such as aluminum alloy and conventionally includes a cooling fluid inlet 202, a cooling fluid outlet 204 and a cooling channel (not shown) interconnecting the inlet 202 and the outlet 204.

As can be better seen from FIG. 12, the cooling assembly includes a generally cylindrical body 206 provided with an internal projection 208 defining an internal shoulder so configured as to receive a cradle 210. The cradle 210 has a generally cylindrical outer surface 212 conforming to the generally cylindrical internal surface of the body 206. The internal surface 214 has a generally C-shaped cross section and is provided with a shoulder 216 that is so configured as to receive the inductance assembly 100 while the coils thereof are safely distant from the cradle 210. The shoulder 216 acting as a longitudinal stop for the inductance assembly 100.

FIG. 13 illustrates that the projection 208 is not continuous and that fasteners 218 are used to mount the cradle 210 to the body 206.

Figure 14:
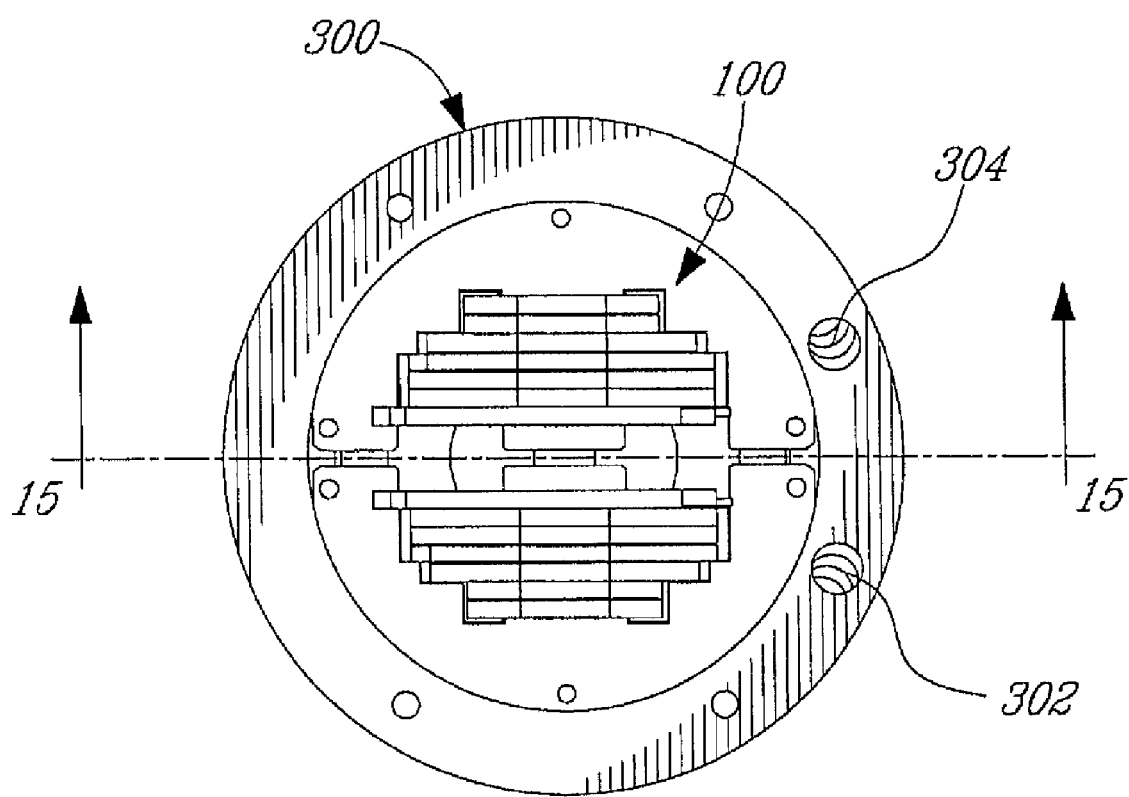
Figure 15:
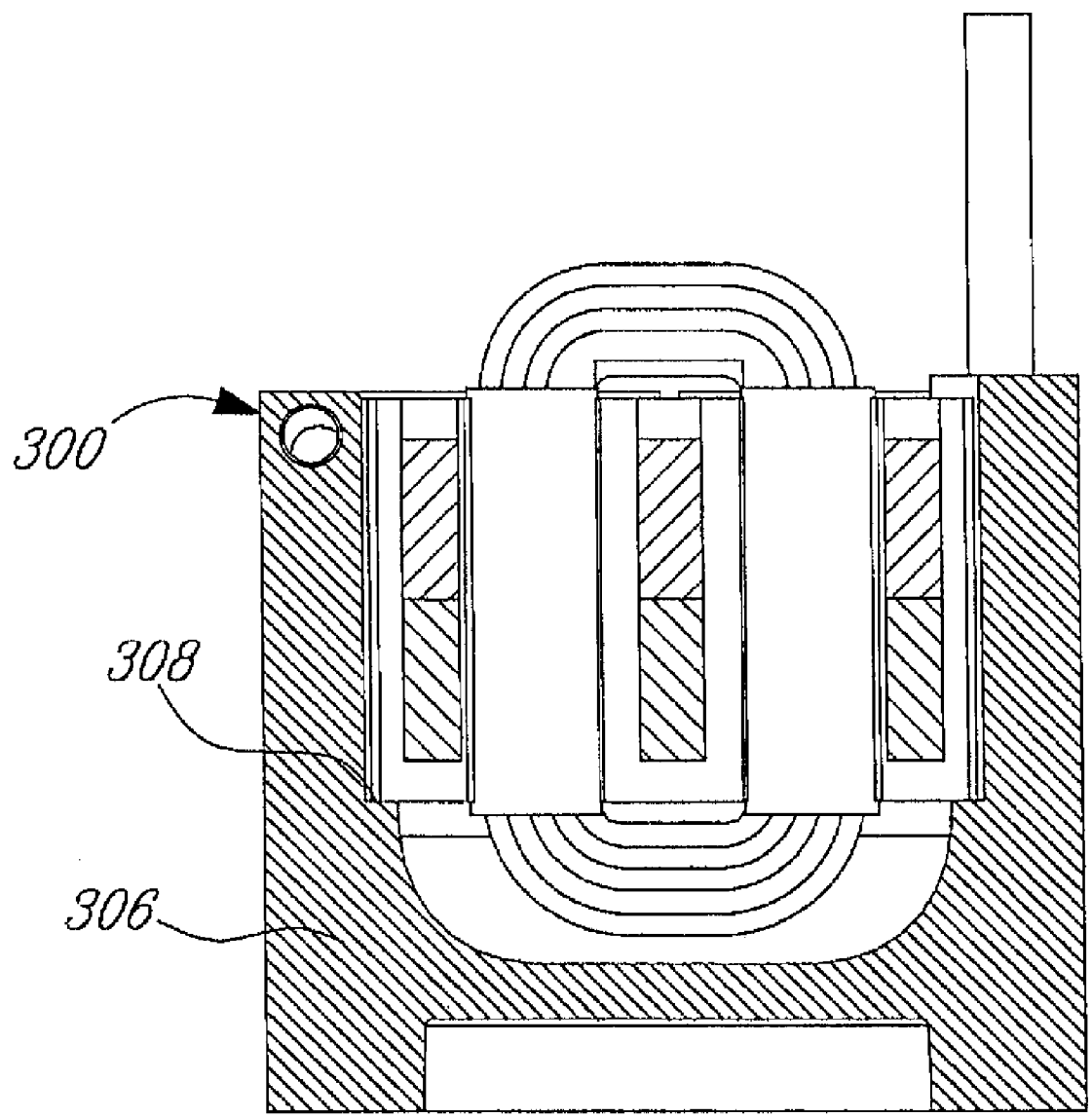
FIG. 15 is a sectional view taken along line 15-15 of FIG. 14.

Referring more specifically to FIGS. 14 to 16, a cooling assembly 300 will be described. Again, the cooling assembly 300 is made of a heat conducting material such as aluminum alloy and conventionally includes a cooling fluid inlet 302, a cooling fluid outlet 304 and a cooling channel (not shown) interconnecting the inlet 302 and the outlet 304. The cooling assembly 300 is very similar to the cooling assembly 200 described hereinabove. Accordingly, only the differences therebetween will be describes herein.

As can be better seen from FIG. 15, the body 306 of the cooling assembly 300 is a one piece molded element including a cradle portion similar in shape to the separated cradle 210 of FIG. 12. Again a shoulder 308 receives the inductance assembly 100 in an appropriate position since it acts as a longitudinal stop for the inductance assembly 100.

It is to be noted that while rectangular wire is used to form the coils 30 illustrated herein, other wire cross-sections could be used.

It is to be noted that during the assembly of the inductance assembly, the body portions can be independently impregnated with resin once the coils 30 have been inserted therein. Of course, both body portions could be impregnated at the same time.

It is also to be noted that while the inductance assemblies illustrated hereinabove include two body portions, one skilled in the art could design an inductance assembly according to the principles of the present invention using more than two body portions.

It is also to be noted that insulation film (not shown) can be provided between the coils and the body portions. One skilled in the art is believed to be in a position to determine an adequate insulation film.

It is also to be noted that an adhesive (not shown) may be provided between the body portions and the cooling assembly. One skilled in the art is believed to be in a position to determine an adequate adhesive.

It is to be understood that the invention is not limited in its application to the details of construction and parts illustrated in the accompanying drawings and described hereinabove. The invention is capable of other embodiments and of being practiced in various ways. It is also to be understood that the phraseology or terminology used herein is for the purpose of description and not limitation. Hence, although the present invention has been described hereinabove by way of illustrative embodiments thereof, it can be modified, without departing from the spirit, scope and nature of the subject invention.

What is claimed is:

1. An inductance assembly to be mounted in a cooling assembly having a generally cylindrical inner surface; the inductance assembly comprising:
    at least two longitudinal body portions each having a generally semi-cylindrical outer surface so configured as to be mounted to the generally cylindrical inner surface of the cooling assembly; each body portion being provided with a longitudinal central arm defining first and second longitudinal channels;
    at least one coil provided with first and second longitudinal leg portions provided between first and second head portions; the first leg portion being so configured as to be inserted in the first longitudinal channel and the second leg portion being so configured as to be inserted in the second longitudinal channel; and
    at least one clip so mounted between the at least two longitudinal body portions as to bias the generally semi-cylindrical outer surfaces of the at least two longitudinal body portions to the generally cylindrical inner surface of the cooling assembly.

2. The inductance assembly recited in claim 1, wherein the longitudinal central arm is integral with the body portion.

3. The inductance assembly recited in claim 1, wherein the first and second longitudinal channels are stepped channels.

4. The inductance assembly recited in claim 3, wherein the at least one coil includes four coils that are so configured as to be inserted into each other.

5. The inductance assembly recited in claim 4, wherein each coil is so configured as to be positioned in one corresponding step of the stepped channels of the body portions.

6. The inductance assembly recited in claim 1, where the at least one coil includes a plurality of turns of rectangular wire.

7. The inductance assembly recited in claim 1, wherein the at least one coil includes four coils each made of a plurality or turns of rectangular wire and so configured and sized as to be inserted into each other.

8. The inductance assembly recited in claim 1, wherein each at least one clip is made of resilient material and has a longitudinal flat body provided with curved spring portions at both longitudinal ends.

9. The inductance assembly recited in claim 1, wherein each at least one clip includes two complementary wedge shaped blocks.

10. The inductance assembly recited in claim 1, wherein the generally semi-cylindrical outer surface of the at least two longitudinal body portions and the generally cylindrical inner surface of the cooling assembly includes complementary key and keyway arrangements.

11. The inductance assembly recited in claim 1, wherein an adhesive is provided between the generally semi-cylindrical outer surface of the at least two longitudinal body portions and the generally cylindrical inner surface of the cooling assembly.

12. An inductance assembly to be mounted in an electric machine provided with an internal stator having a generally cylindrical inner surface; the inductance assembly comprising:
    a cooling assembly having a generally cylindrical outer surface configured and sized to be inserted in the internal stator, and a generally cylindrical inner surface;
    at least two longitudinal body portions each having a generally semi-cylindrical outer surface so configured as to be mounted to the generally cylindrical inner surface of the cooling assembly; each body portion being provided with a longitudinal central arm defining first and second longitudinal channels;

at least one coil provided with first and second longitudinal leg portions provided between first and second head portions; the first leg portion being so configured as to be inserted in the first longitudinal channel and the second leg portion being so configured as to be inserted in the second longitudinal channel; and at least one clip so mounted between the at least two longitudinal body portions as to bias the generally semi-cylindrical outer surfaces of the at least two longitudinal body portions to the generally cylindrical inner surface of the cooling assembly.

13. The inductance assembly of claim 12, wherein the cooling assembly includes a shoulder so provided on its inner surface to provide a longitudinal stop for the at least two longitudinal body portions.

14. The inductance assembly of claim 13, wherein the shoulder is integral with the internal surface of the cooling assembly.

15. The inductance assembly of claim 13, wherein the shoulder is provided by a cradle element that is insertable in the cooling assembly.

16. The inductance assembly recited in claim 12, wherein the longitudinal central arm is integral with the body portion.

17. The inductance assembly recited in claim 12, wherein the first and second longitudinal channels are stepped channels.

18. The inductance assembly recited in claim 17, wherein the at least one coil includes four coils that are so configured as to be inserted into each other.

19. The inductance assembly recited in claim 18, wherein each coil is so configured as to be positioned in one corresponding step of the stepped channels of the body portions.

20. The inductance assembly recited in claim 12, where the at least one coil includes a plurality of turns of rectangular wire.

21. The inductance assembly recited in claim 12, wherein the at least one coil includes four coils each made of a plurality or turns of rectangular wire and so configured and sized as to be inserted into each other.

22. The inductance assembly recited in claim 12, wherein each clip is made of resilient material and has a longitudinal flat body provided with curved spring portions at both longitudinal ends.

23. The inductance assembly recited in claim 12, wherein each clip includes two complementary wedge shaped blocks.

24. The inductance assembly recited in claim 12, wherein the generally semi-cylindrical outer surface of the at least two longitudinal body portions and the generally cylindrical inner surface of the cooling assembly includes complementary key and keyway arrangements.

25. The inductance assembly recited in claim 12, wherein an adhesive is provided between the generally semi-cylindrical outer surface of the at least two longitudinal body portions and the generally cylindrical inner surface of the cooling assembly.

* * * * *